(12) United States Patent  (10) Patent No.: US 6,720,930 B2
Johnson et al.                (45) Date of Patent:    Apr. 13, 2004

(54) OMNIDIRECTIONAL RFID ANTENNA

(75) Inventors: Daniel L. Johnson, Columbia Heights, MN (US); Yuri Smirnov, Eagan, MN (US)

(73) Assignee: Digital Angel Corporation, South St. Paul, MN (US)

( * ) Notice: Subject to any disclaimer, the term of this patent is extended or adjusted under 35 U.S.C. 154(b) by 0 days.

(21) Appl. No.: 10/050,278

(22) Filed: Jan. 15, 2002

(65) Prior Publication Data

US 2002/0109636 A1 Aug. 15, 2002

Related U.S. Application Data

(60) Provisional application No. 60/262,294, filed on Jan. 16, 2001.

(51) Int. Cl.[7] .............................................. H01Q 11/12
(52) U.S. Cl. ..................... 343/742; 343/867; 340/572.7
(58) Field of Search ............................... 343/742, 867, 343/842; 340/572.1, 572.7, 572.8; 119/51.02

(56) References Cited

U.S. PATENT DOCUMENTS

| | | | | |
|---|---|---|---|---|
| 2,304,446 A | * | 12/1942 | Eaton .......................... | 342/422 |
| 2,485,675 A | * | 10/1949 | Taylor et al. ................ | 342/420 |
| 3,689,885 A | | 9/1972 | Kaplan et al. ............... | 340/152 |
| 4,065,753 A | | 12/1977 | Paul, Jr. ...................... | 340/152 |
| 4,262,632 A | | 4/1981 | Hanton et al. ................ | 119/1 |
| 4,388,730 A | | 6/1983 | Nash et al. .................. | 455/208 |
| 4,510,495 A | | 4/1985 | Sigrimis et al. ......... | 340/825.54 |
| 4,617,876 A | | 10/1986 | Hayes ......................... | 119/155 |
| 4,730,188 A | | 3/1988 | Milheiser ..................... | 340/825 |
| 4,798,175 A | | 1/1989 | Townsend et al. .......... | 119/155 |
| 5,041,826 A | | 8/1991 | Milheiser ............... | 340/825.54 |
| 5,211,129 A | | 5/1993 | Taylor et al. ................. | 119/3 |
| 5,574,470 A | | 11/1996 | De Vall ...................... | 343/895 |
| 5,686,902 A | | 11/1997 | Reis et al. ............. | 340/825.54 |
| 5,711,246 A | * | 1/1998 | Yano et al. .............. | 119/51.02 |
| 5,923,300 A | | 7/1999 | Mejia ......................... | 343/788 |
| 5,952,935 A | | 9/1999 | Mejia et al. ........... | 340/825.54 |
| 6,000,361 A | | 12/1999 | Pratt ....................... | 119/51.02 |
| 6,014,107 A | * | 1/2000 | Wiesenfarth ................. | 343/742 |
| 6,069,564 A | * | 5/2000 | Hatano et al. ........... | 340/572.7 |
| 6,166,637 A | * | 12/2000 | Cyr et al. ................. | 340/572.7 |
| 6,184,777 B1 | * | 2/2001 | Mejia ......................... | 340/10.1 |

* cited by examiner

*Primary Examiner*—Don Wong
*Assistant Examiner*—Shih-Chao Chen
(74) *Attorney, Agent, or Firm*—Sheridan Ross P.C.

(57) ABSTRACT

An omni-directional RFID antenna is provided for use with a remote interrogator/reader system used for identifying tagged animals. A pair of antenna coils are arranged in a crossing pattern that results in the creation of an omni or multi-directional electromagnetic field. Additionally, the crossing pattern creates out of phase null zones at quadrants within the crossing pattern of the antennae that reduces interference caused by RF noise generated from the environment. The omni-directional electromagnetic field effectively surrounds each of the null zones thereby allowing an RFID transponder to be successfully interrogated despite the orientation of the transponder as it passes through the electromagnetic field.

26 Claims, 2 Drawing Sheets

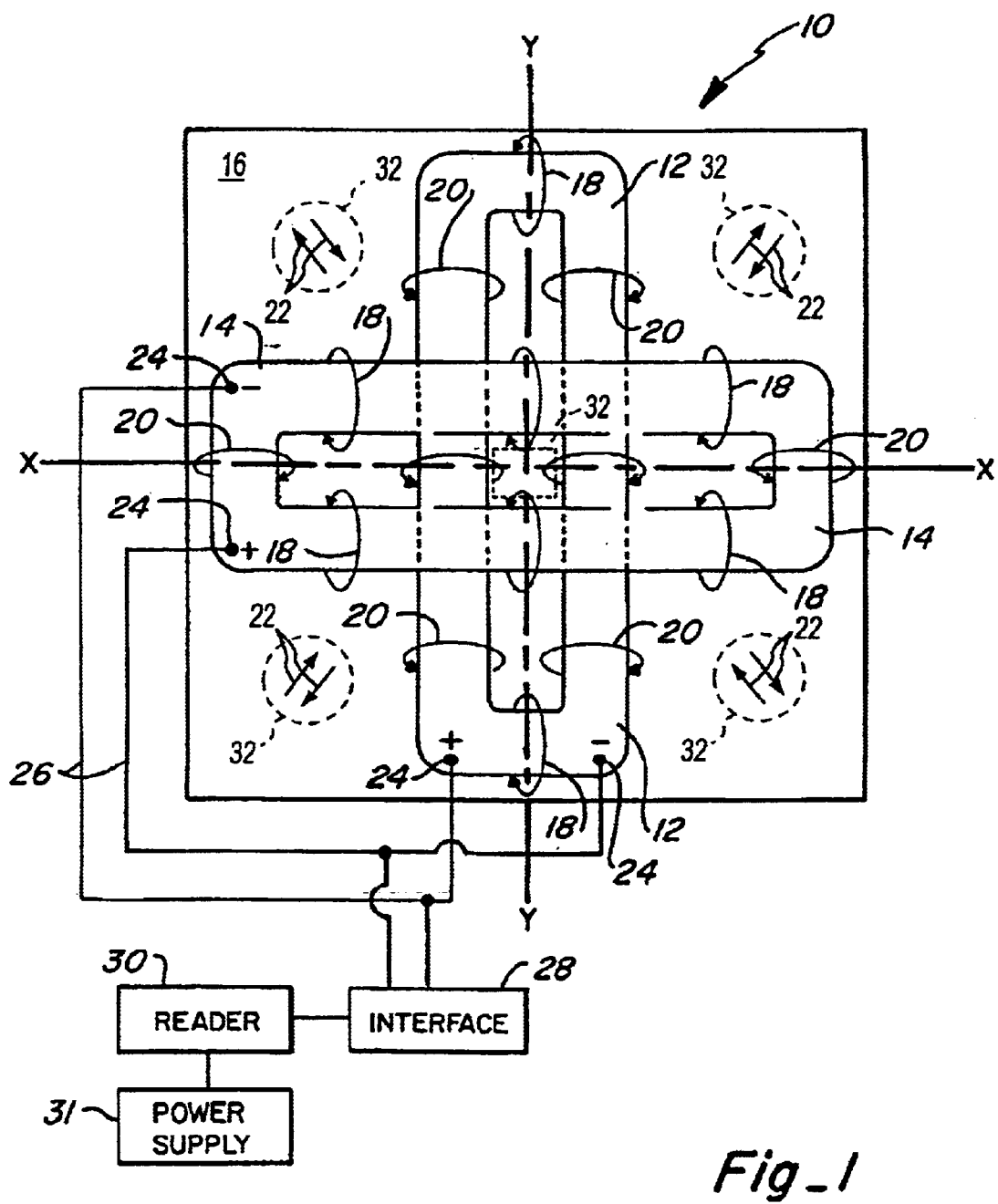
Fig_1

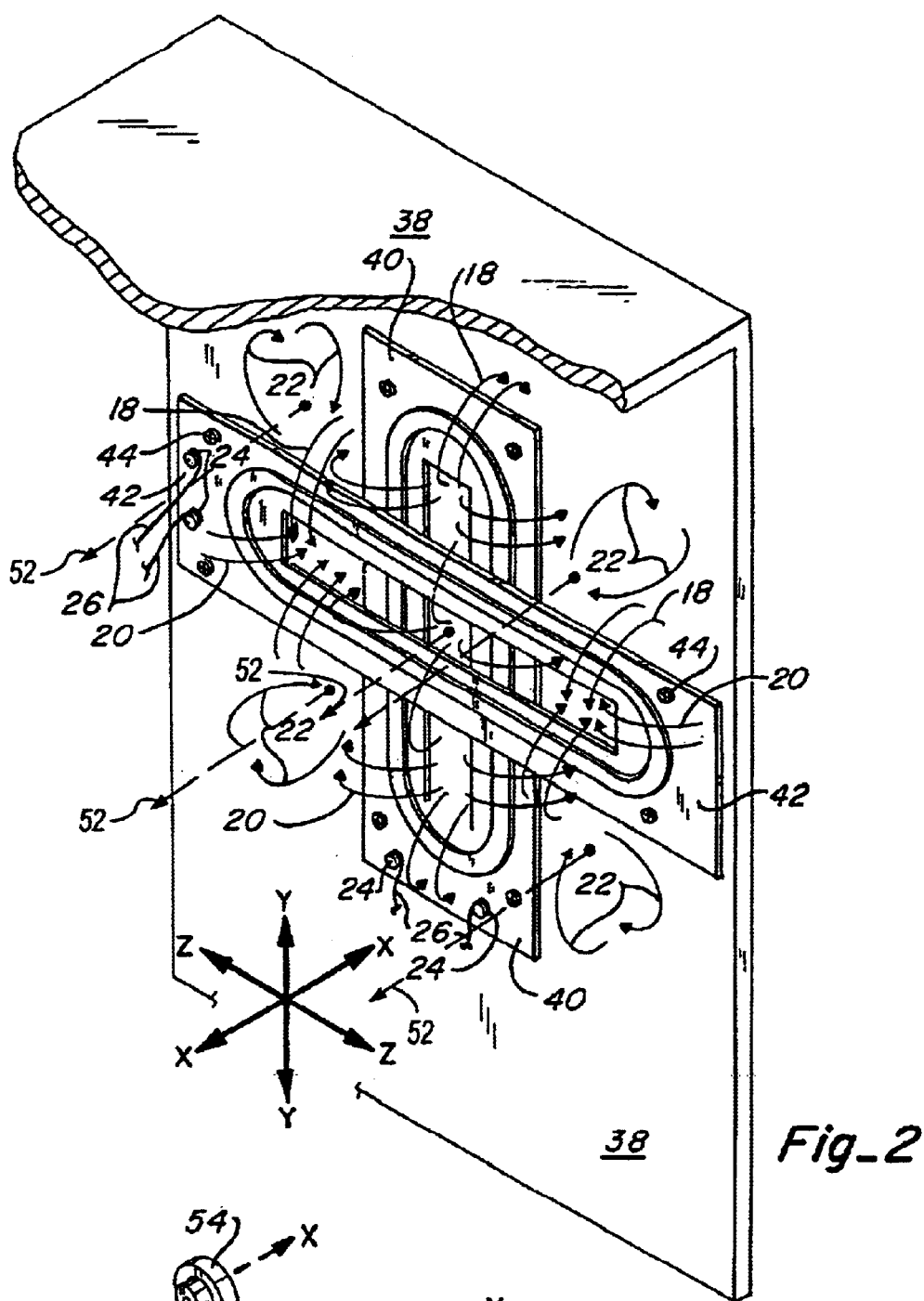
Fig_2
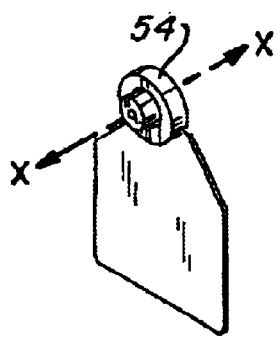
Fig_3
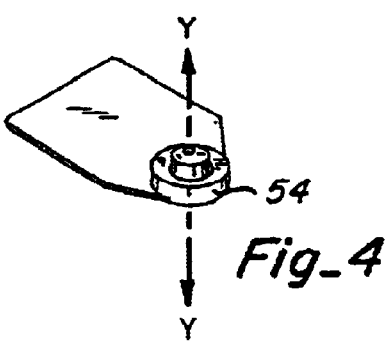
Fig_4

OMNIDIRECTIONAL RFID ANTENNA

This application claims priority from U.S. Provisional Patent Application No. 60/262,294 filed on Jan. 16, 2001. The entire disclosure of the provisional patent application is considered to be part of the disclosure is hereby incorporated by reference in its entirety.

FIELD OF THE INVENTION

This invention relates to wireless devices, and more particularly, to an antenna attached to a remote sensing apparatus or interrogator for use in detecting wireless communication devices such as radio frequency identification (RFID) tags or transponders affixed to livestock for identification of an animal as it passes proximate to the antenna.

BACKGROUND OF THE INVENTION

Wireless memory devices for storing and transmitting data such as RFID transponders or tags are generally known in the art. Such transponders are typically used in the livestock for industry for tracking and accounting for livestock. During many stages of livestock management, it is necessary to record data about a particular animal, and to distinguish between animals. The RFID tags are useful not only for livestock, but in connection with other animals such as salmon and other migratory animals which are observed for various scientific and environmental purposes.

While RFID tags have certain advantages, particularly with respect to the amount or type of data that might be retrieved about a particular animal, there are also many disadvantages associated with the use of RFID tags. First, the transponder to be monitored is attached to the animal in a manner where the final position or orientation of the transponder cannot be controlled as it passes through the interrogation field in order to read the tag. In order to optimize reading of a transponder, the transponder antenna should be aligned with the various fields generated by the interrogator antenna. Poor environmental conditions can also affect the ability of an interrogator antenna to read the tag as it passes through the interrogation field. Yet another problem associated with RFID tags is an antenna that does not produce an adequate electromagnetic field, that is, a field that is not of sufficient strength to excite the tag in order that it may transmit its information. Yet another problem, which has arisen with respect to RFID tags is RF noise that is present in many industrial locations in which the tags are used. The RF noise can disrupt the interrogation field produced by the interrogator antenna thus preventing the ability to successfully interrogate a particular tag. As well understood by those skilled in the art, RF noise can be generated by surrounding electromagnetic devices that could be in close proximity to the interrogator antenna, or could be some distance away but the RF noise created by the remote electromagnetic device is of such sufficient strength that it still disrupts the interrogation field.

In the design of a great majority of antennas, it is undesirable to create null zones or out of phase areas within the electromagnetic field generated by the interrogator antenna. Such null zones represent areas in which an RFID tag cannot be interrogated because there is no electromagnetic energy within the null zone to excite the coil of the RFID tag. Therefore, creating null zones by an interrogator antenna is typically undesirable. However, out of phase areas within an electromagnetic field are also effective in canceling RF noise.

Therefore, it would be advantageous for an interrogator antenna to be developed which could alleviate RF noise by creating out of phase areas within the electromagnetic field generated by the antenna but at the same time, the antenna being capable of generating an omni-directional electromagnetic field that is still effective in interrogating an RFID transponder.

SUMMARY OF THE INVENTION

The present invention addresses the problems of RF noise by providing an antenna design which is effective in canceling RF noise, yet still is able to generate an omnidirectional electromagnetic field for effective interrogation of RFID transponders.

In the preferred embodiment of the invention, the antenna comprises a pair of antenna coils that are placed in a crossing relationship with one another. More specifically, a first antenna coil is provided in a closed loop configuration which extends along a first axis, and a second antenna coil is provided of a closed loop arrangement which extends along a second axis, the second antenna coil being placed perpendicular to and in close proximity with the first antenna coil. The antenna coils are wired in parallel, in phase. The antennas should be oriented out-of-phase to create the required fields to achieve maximum performance. The crossing pattern formed by the pair of coils forms four external legs of the antenna. Electromagnetic fields are generated from each of the legs of the antenna in multiple directions away from the antenna thus providing a combined electromagnetic field which is able to interrogate an RFID transponder despite its potential for being oriented in many different angles as it passes through the electromagnetic field. Because of the directionally oriented magnetic fields produced by each of the legs of the antenna, five null zones or out of phase areas are generated within the crossing pattern of the antenna itself. There is no appreciable degradation of the electromagnetic field used for interrogation, because a tag to be interrogated always passes externally of the antenna and not actually through the plane of the antenna. In other words, the omni-directional field generated by the antenna has field portions that surround or isolate the null zones such that a moving transponder cannot reach a null zone without also contacting some portion of the electromagnetic field.

The size and power of the antenna can be adapted for the particular application in which the RFID transponders are to be interrogated. For livestock operations, one acceptable size for the antenna would include the crossing antenna coils each having a length of approximately 20 inches long and six inches wide, the width being measured between opposite sides of the closed loop coil.

In use, the antenna may be mounted to a walk through corridor or chute through which the livestock are directed. Cattle chutes or corridors are common structures found in most feedlocks or other cattle containment areas. Alternatively, the antenna of the invention could be mounted to any other stationary object, which is placed in close proximity to the RFID transponders to be interrogated.

The above described features and advantages of the invention will become more apparent from a review of the following description, taken in conjunction with the accompanying drawings.

BRIEF DESCRIPTION OF THE DRAWINGS

FIG. 1 is a planar view of the antenna of the present invention, along with a combined electrical schematic diagram illustrating the components which support the antenna in an interrogation system, and FIG. 1 further illustrates flux lines corresponding to the individual fields making up the overall or combined omni-directional electromagnetic field generated by the antenna;

FIG. 2 is a perspective view of the antenna mounted to a structure, such as a livestock chute, for interrogating an RFID transponder attached to an animal; and FIGS. 3 and 4 illustrate sample orientations of RFID transponders, which may pass through the cattle chute and are effectively interrogated by the electromagnetic field of the antenna.

DETAILED DESCRIPTION OF THE INVENTION

According to FIG. 1, a preferred embodiment of the invention is depicted. The antenna 10 includes a first antenna coil 12 illustrated in a vertical orientation, and a second crossing or intercepting coil 14, which is shown in a horizontal orientation. The first coil can be further defined as extending along a first axis y—y, while the second coil 14 can be further described as extending along a second axis x—x, which is substantially perpendicular to the y—y axis 12. While the first and second coils have been illustrated as extending in the vertical and horizontal orientations, respectively, it shall be understood that during use of the antenna, the antenna could be canted or tilted such that the respective coils extend in directions which are not necessarily precisely vertical and horizontal; however, it being important that the crossing pattern or perpendicular arrangement of the antenna coils be maintained. The antenna coils are contained within a housing, generally illustrated as housing 16. The housing 16 may be either a flexible or rigid material able to withstand extreme environments ranging from extremely hot conditions with significant sun exposure, to bitter cold conditions. Example materials for the housing could include, but is not limited to, materials such as Gore-tex®, Kevlar®, or even treated canvas. The housing should also be capable of being regularly cleaned without degrading the housing material itself. The housing 16 can be one integral piece of material, or can be two separate pieces of material, one piece of material covering to one of the antenna coils, and another piece of material covering the other antenna coils.

The legs of the antenna can be defined as the four ends of the antenna coils, which extend away from each other in the 90° arrangement. The electromagnetic field generated by the antenna is graphically depicted in FIG. 1 as a plurality of flux lines surrounding the various sections of the antenna coils. For purposes of simplifying visualization of the flux lines, there are three primary types of flux lines shown, namely, (1) flux lines generated in a vertical or "y" direction, shown as flux lines 18, (2) flux lines generated in the "x" or horizontal direction, illustrated as flux lines 20, and (3) flux lines generated in an angular direction away from each of the legs of the antenna, illustrated as flux lines 22. Thus, it can be seen in FIG. 1 that an omni-directional electromagnetic field is generated away from each leg of the antenna, thus providing an electromagnetic field, which can effectively interrogate a transponder passing through the field. Preferably, the antenna coils should be wrapped in a rectangular shaped closed loop configuration to allow proper field strength in each orientation.

FIG. 1 further shows a pair of terminals 24 which are mounted to one end of each of the coils, and which provide an electrical connection for conductors 26 which power the antenna. Incoming transponder signals from a transponder are received by the antennae and are electrically transferred to an interface 28. Interface 28 typically strips a modulated FM transponder signal of its carrier signal, and places the transponder signal in a format, which may be used by the reader 30. The demodulated transponder signal is then manipulated by the reader 30, which also includes a user interface such that a user may record, manipulate, or otherwise monitor data which has been transmitted by the particular transponder. The interface also provides the means to allow proper tuning on both receive and exciter sides of the antenna. Thus, the interface functions similar to a standard tuner for an analog receiver of an AM/FM radio. The reader 30 can be one of many commercially available units that is adapted for the RFID standard (125 kHz-134 kHz). Similar readers found in other applications include building security systems. Additionally, FIG. 1 also illustrates a power supply 31, which is used to power the interface 28 and the reader 30.

The null zones which are created within the antenna illustrated in FIG. 1 are the areas within dashed lines 32. As shown, the antenna includes out-of-phase areas defined by the null zones 32 wherein there is no electromagnetic field generated by the antenna. However, there are also electromagnetic flux lines, which surround each of the null zones, thereby limiting the impact of the null zones on the ability of the antenna to successfully interrogate a transponder. The largest areas of the null zones are created within the crossing pattern of the antenna itself, and the null zones diminish as one moves away from the antenna.

FIG. 2 illustrates the antenna of the invention mounted on a cattle chute 38, or some other structure, which is positioned adjacent to a pathway in which the animals move for purposes of reading their tags. It shall be understood that chute 38 is not specifically limited to any particular type of structure, but simply represents some type of mounting which stabilizes the antenna 10 in a position adjacent to the moving animals such that the animals move through the electromagnetic field generated by the antenna. The housing may be attached to the cattle chute as by any well known means to include bolts 44, or other hardware. FIG. 2 also illustrates that the antenna may include two distinct sub-housings, shown as sub-housings 40 and 42, which contain their respective antenna coils 12 and 14. FIG. 2 also shows that the second coil 14 may be placed over the first coil 12, the first and second coils being placed in close proximity or in contact with one another in their mounted position on cattle chute 38. Preferably, the coils should be placed in contact with one another, or in close proximity with each other within 0–2 mm. As discussed above, in lieu of a pair of sub-housings, one integral housing could be used for the antenna.

An animal would pass through the cattle chute in the direction "z", as shown in the orientation of the axis in FIG. 2. The "y" axis and the "x" axis are also illustrated. Because of the perspective view of FIG. 2, it is noted that the "x" and "y" axis in FIG. 2 do not correspond to the "x" and "y" axis of FIG. 1.

Finally, FIG. 2 also illustrates the direction in which the null zones extend, shown as extension lines 52 extending in the "x" direction. Despite the height or angular orientation of the animal as it passes through the chute 38, the animal will have some component of its travel in the "z" direction. Thus, according to the orientation of the antenna shown in FIG. 2, prior to the animal having its transponder pass through the null zones represented by extensions 52, the transponder must first pass through at least some portion of the electromagnetic field generated by the antenna. Specifically for FIG. 2, at least one of the components of the electromagnetic field, which the transponder will come into contact with, would be the portion of the electromagnetic field denoted by flux lines 20. As the animal continues through the cattle chute, the transponder will continue to contact various sections of the electromagnetic field and perhaps one of the null zones; however, contact with the null zone is at most intermittent because flux patterns surround each of the null zones.

FIGS. 3 and 4 illustrate two example orientations of a transponder tag 54 as it may pass through the field of the antenna. For FIG. 3, the coil (not shown) incorporated within the transponder of the tag is oriented in the vertical direction, and it will be optimally read by the electromagnetic field created in the "x" direction, namely, the portion of the field illustrated by flux lines 20. For FIG. 4, the coil (not shown) within the transponder is oriented parallel to the ground, and the transponder is optimally read by an electromagnetic field created in the "y" direction, namely, the portion of the electromagnetic field illustrated by flux lines 18. It shall be understood that the orientations of the transponder tags shown in FIGS. 3 and 4 are simply representative of the orientations which may be present during operation of the invention, and it shall be understood that multiple variations of the illustrated transponder orientations will result in some portion of the electromagnetic field contacting the transponder in order to successfully interrogate the transponder.

Because of the cross orientation of the antenna and the in-phase areas of the electromagnetic field generated by the antenna, at each of the legs of the antenna, a transponder which move through the electromagnetic field transmits a transponder signal which is summed thus enhancing the ability of the antenna to read the transponder. In other words, since the transponder is always moving and will be asymmetrically located relative to the legs of the antenna, the antenna will be able to read the tag. If incoming noise from the environment is present, this noise will be evenly distributed across the entire field of the antenna and will not be a moving element like the transponder; therefore, the noise is subtracted or cancelled.

Placing the antennas in a cross-like orientation, whose activation is in opposite orientation, provides cancellation of outside RF signals affecting both antennas in similar field strength and, thus, the noise is cancelled or minimized. But for signals such as the transponder, that is a moving field, the RF signal will be summed giving the single transponder signal as a result.

By way of example only and not by way of limitation, the coils may each consist of approximately 22-gauge wire, and each coil may have approximately 25 windings. The combined inductance of the electromagnetic field generated by the antenna is preferably below 400 $\mu$H. As understood by those skilled in the art, an inductance below this level generally provides a broader resonance curve thereby increasing the transponder detection range.

The invention has been described above with respect to a preferred embodiment; however, it shall be understood that various modifications may be made to the preferred embodiment that fall within the spirit and scope of the invention.

We claim:

1. An antenna for use with a remote interrogator/reader unit used to detect information specific to each of a plurality of radio frequency transponders attached to animals, said antenna comprising:
    a first antenna coil arranged in a closed loop configuration and extending along a first axis;
    a second antenna coil arranged in a closed loop configuration and extending along a second axis, said first coil positioned in close proximity to said second coil and oriented so that first axis extends substantially perpendicular to said second axis forming a crossing pattern;
    a housing containing said first and second coils, said housing capable of being positioned in the proximity of said transponders; and
    wherein said antenna generates multi-directional electromagnetic fields when powered by said remote interrogator/reader unit, and said first and second antenna coils are activated in opposite orientation said activation thereby reducing RF noise from the environment.

2. The antenna, as claimed in claim 1, wherein:
    said generated electromagnetic fields have a total inductance of less than 400 $\mu$H.

3. The antenna, as claimed in claim 1, wherein:
    said coils are made of approximately 22-gauge wire.

4. The antenna, as claimed in claim 1, wherein:
    each coil contains about 25 windings.

5. The antenna, as claimed in claim 1, wherein:
    said first antenna coil is substantially contained in a first plane;
    said second antenna coil is substantially contained in a second plane; and
    wherein said first and second planes are substantially parallel.

6. An antenna for use with a remote interrogator/reader used to detect information specific to each of a plurality of radio frequency transponders attached to animals, said antenna comprising:
    a pair of cross oriented antenna coils having an out of phase orientation to cancel external RF noise, said pair of cross oriented antenna coils further creating multi-directional electromagnetic fields extending away from said coils and effective to interrogate said transponders.

7. The antenna, as claimed in claim 6, wherein:
    said electromagnetic fields have a total inductance of less than 400 $\mu$H.

8. The antenna, as claimed in claim 6, wherein:
    said coils are made of approximately 22-gauge wire.

9. The antenna, as claimed in claim 6, wherein:
    each coil contains about 25 windings.

10. An antenna for use with a remote interrogator/reader unit used to detect information specific to each of a plurality of radio frequency transponders attached to animals, said antenna comprising:
    means for creating an omni-directional field of electromagnetic energy effective to interrogate said transponders;
    means for creating out of phase relationships within said omni-directional field to reduce RF noise generated from the surrounding environment; and
    wherein said antenna is arranged in a crossing pattern of antenna coil members.

11. The antenna, as claimed in claim 10, wherein:
    said omni-directional field of electromagnetic energy has a total inductance of less than about 400 $\mu$H.

12. The antenna, as claimed in claim 10, wherein:
    said coil members are made of approximately 22 gauge wire.

13. The antenna, as claimed in claim 10, wherein:
    said coil members contain approximately 25 windings each.

14. A method of interrogating a radio frequency transponder by an antenna used within a remote interrogator/reader system, the radio frequency transponder being adapted especially for use in tagging animals, said method comprising the steps of:

providing a first antenna coil having a closed loop configuration;

positioning a second antenna coil having a closed loop configuration such that said second coil extends substantially perpendicular to said first coil thus creating a crossing pattern between the first and second antenna coils;

exciting the antenna to create an omni-directional field of electromagnetic energy, and to create an out of phase relationship within the crossing pattern, the out of phase relationship being effective to cancel RF noise generated from the surrounding environment; and passing the transponder through the electromagnetic field resulting in the transponder being activated to transmit a radio frequency signal unique to the transponder.

15. An antenna for use with a remote interrogator/reader unit used to detect information specific to each of a plurality of radio frequency transponders, said antenna comprising:

a first antenna coil arranged in a closed loop configuration extending along a first axis and substantially contained in a first plane; and a second antenna coil arranged in a closed loop configuration extending along a second axis and substantially contained in a second plane, said first coil positioned in close proximity to said second coil and oriented so that said first axis extends substantially perpendicular to said second axis forming a crossing pattern and said first plane is substantially parallel to said second plane.

16. The antenna, as claimed in claim 15, further comprising:

a housing containing said first and second coils, said housing capable of being positioned in the proximity of said transponders.

17. The antenna, as claimed in claim 15, wherein:

said antenna generates multi-directional electromagnetic fields when powered by said remote interrogator/reader unit.

18. The antenna, as claimed in claim 15, wherein:

said first and second coils are activated in opposite orientation to provide cancellation of RF noise from the environment.

19. The antenna, as claimed in claim 15, wherein:

said generated electromagnetic fields have a total inductance of less than 400 $\mu$H.

20. The antenna, as claimed in claim 15, wherein:

said coils are made of approximately 22 gauge wire.

21. The antenna, as claimed in claim 15, wherein:

each coil contains about 25 windings.

22. A method of interrogating a radio frequency transponder by an antenna used within a remote interrogator/reader system, the radio frequency transponder being adapted especially for use in tagging animals, said method comprising the steps of:

providing a first antenna coil having a closed loop configuration extending along a first axis;

providing a second antenna coil having a closed loop configuration extending along a second axis;

electrically connecting said first and second antenna coils in parallel and in phase to a reader/interrogator;

positioning said first and second antenna coils within a housing wherein said second antenna coil is positioned relative to said first antenna coil such that electromagnetic fields generated from the first and second antenna coils are out of phase and such that said first axis is substantially perpendicular to said second axis thus creating a crossing pattern between the first and second antenna coils;

exciting the antenna to create an omni-directional field of electromagnetic energy;

passing the transponder adjacent to said housing and through the electromagnetic field resulting in the transponder being activated to transmit a radio frequency signal unique to the transponder; and summing the signals received at the first and second antenna coils to cancel noise from the surrounding environment and obtain said radio frequency signal unique to the transponder.

23. The method, as claimed in claim 22, wherein:

said first antenna coil is substantially contained in a first plane;

said second antenna coil is substantially contained in a second plane; and wherein said first and second planes are substantially parallel.

24. The method, as claimed in claim 22, wherein:

said generated electromagnetic fields have a total inductance of less than 400 $\mu$H.

25. The method, as claimed in claim 22, wherein:

said coils are made of approximately 22 gauge wire.

26. The method, as claimed in claim 22, wherein:

each coil contains 25 windings.

\* \* \* \* \*

UNITED STATES PATENT AND TRADEMARK OFFICE
CERTIFICATE OF CORRECTION

PATENT NO. : 6,720,930 B2
DATED : April 13, 2004
INVENTOR(S) : Johnson et al.

It is certified that error appears in the above-identified patent and that said Letters Patent is hereby corrected as shown below:

Column 5,
Line 64, please delete "attached to" and substitute therefor -- used for tagging --.

Column 6,
Line 12, between the words "orientation" and "said", please add -- , --.

Signed and Sealed this

Twenty-fifth Day of May, 2004

JON W. DUDAS
*Acting Director of the United States Patent and Trademark Office*